United States Patent

[11] 3,631,274

[72] Inventors Bob E. Stauder
5649 S. New Haven, Tulsa, Okla. 74135;
William O. Christianson, 6625 S. 70th East Ave., Tulsa, Okla. 74133
[21] Appl. No. 32,232
[22] Filed Apr. 27, 1970
[45] Patented Dec. 28, 1971
[73] Assignee Dorsett Electronics, a Division of La Barge, Inc.
Tulsa, Okla.

[54] PROGRAM SEQUENCE INITIATOR
7 Claims, 4 Drawing Figs.
[52] U.S. Cl. .................................................. 310/66, 310/75 A
[51] Int. Cl. .................................................. H02k 7/18
[50] Field of Search ......................................... 310/75 A, 75 B, 69, 66; 290/1 E

[56] References Cited
UNITED STATES PATENTS
2,524,005 9/1950 Boe .............................. 290/1
2,542,164 2/1951 Tatro ........................... 310/69 X Primary Examiner—D. X. Sliney
Attorney—Head & Johnson ABSTRACT: This invention relates to a power supply for generating an electrical pulse. More particularly, the invention is a power supply for generating an electrical pulse including a housing, at least one coil of wire supported by the housing, a magnetic rotor supported by the housing and rotatable relative to the coil, and spring means interconnected to the magnetic rotor and adapted upon unwinding of the spring means to rotate the magnetic rotor relative to the coil to induce a voltage pulse in the coil.

PATENTED DEC 28 1971
3,631,274
SHEET 1 OF 2
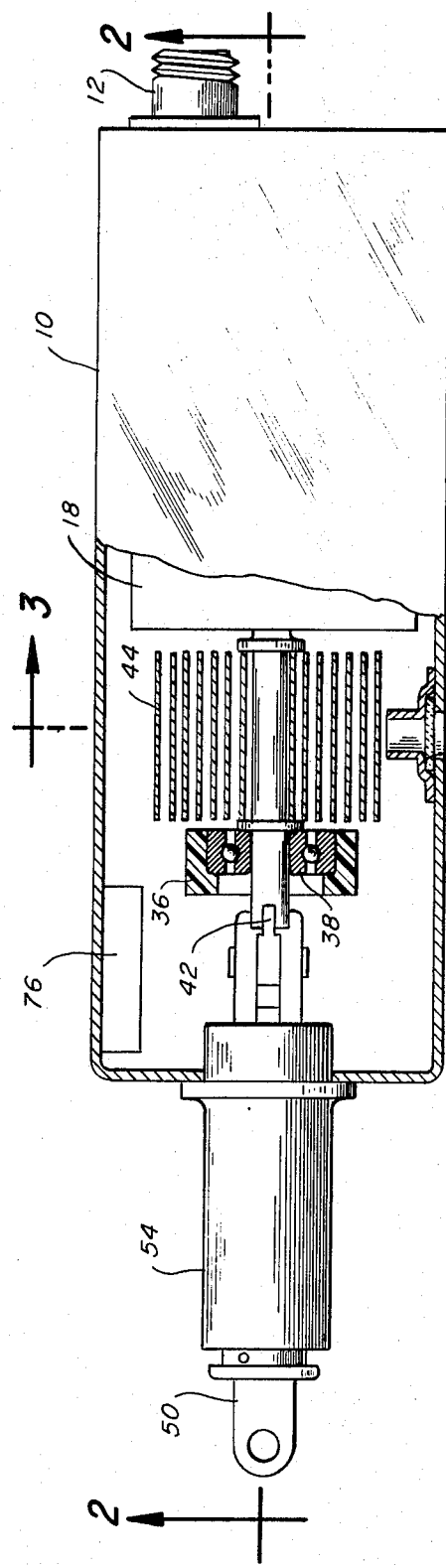
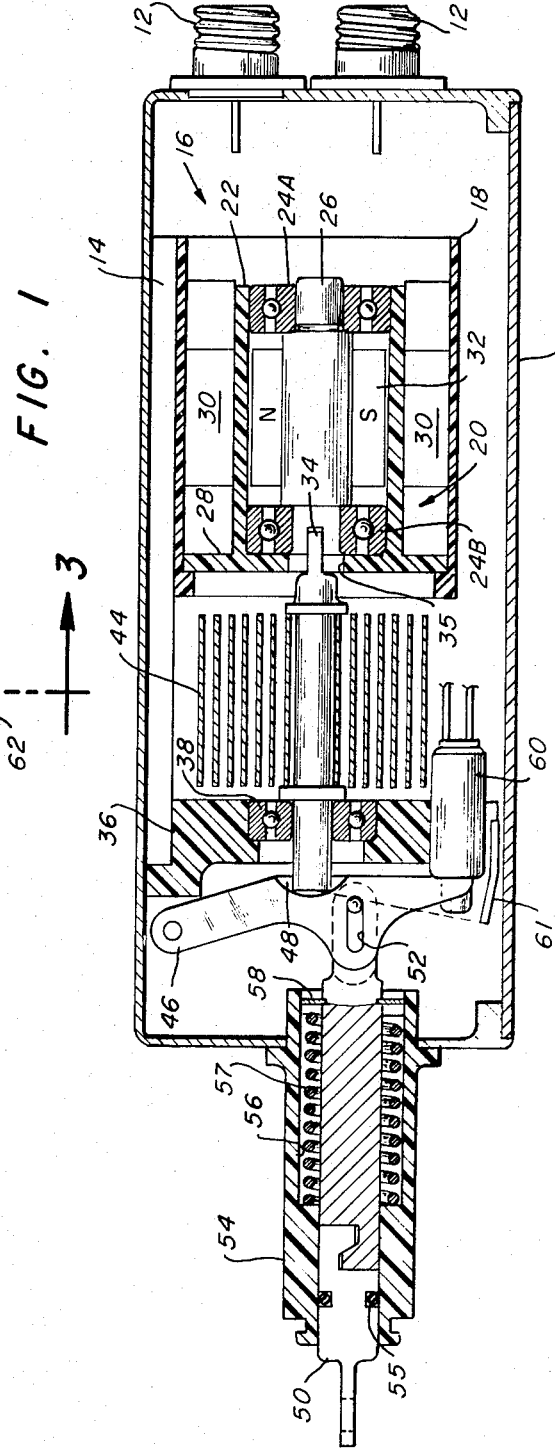
INVENTOR.
BOB E. STAUDER
WILLIAM O. CHRISTIANSON
BY
Head & Johnson
ATTORNEYS INVENTOR.
BOB E. STAUDER
WILLIAM O. CHRISTIANSON
BY
Head & Johnson
ATTORNEYS

PROGRAM SEQUENCE INITIATOR

BACKGROUND AND OBJECTS OF THE INVENTION

It is frequently necessary to provide an electrical voltage pulse for initiating a system event or sequence. As an example, pilot-ejecting devices require a voltage pulse to actuate a sequence of events as a part of the pilot escape system. Obviously, voltage pulses can be initiated utilizing electrical energy available from the aircraft electrical system. However, in order for the pilot escape system to be completely dependable it must be designed to function in the event of failure of the aircraft electrical system. Batteries may be utilized as a backup or supplement to the aircraft electrical system however every known type of battery has a limited life, and in any event any accidental current leakage soon dissipates the batter. Therefore batteries are undesirable since they must be frequently checked to assure their ready state. It is therefore an object of this invention to provide a power supply for generating an electrical pulse which can be utilized by way of example in an aircraft pilot ejection system to produce a voltage pulse when desired independent of the aircraft electrical system.

Another object of this invention is to provide a power supply for generating an electrical pulse which remains dependable for an unlimited length of time and which does not have to be periodically checked to make certain that it is in a ready state.

Another object of this invention is to provide a device for generating an electrical pulse upon the physical unwinding of a coil spring.

Another object of this invention is to provide a device for producing a time space sequence of electrical pulses upon the unwinding of a coil spring.

These general objects as well as more specific objects of the invention will be understood by reference to the description and claims taken in conjunction with the attached drawings.

SUMMARY

Generally the power supply of this invention comprises an electrical alternator which utilizes a coil spring for rotatably driving the rotor thereof. The rotor has received thereon for common rotation therewith magnetic means whose lines of force cut electrical coils would on the armature of the alternator to induce a voltage pulse in the coils.

DESCRIPTION OF THE DRAWINGS

FIG. 1 of the drawings is a partial top cross-sectional view of the pulse generator of this invention.

FIG. 2 of the drawings is a side cross-sectional view of the electrical pulse generator of this invention.

DETAILED DESCRIPTION OF THE PREFERRED EMBODIMENT

Figure 3:
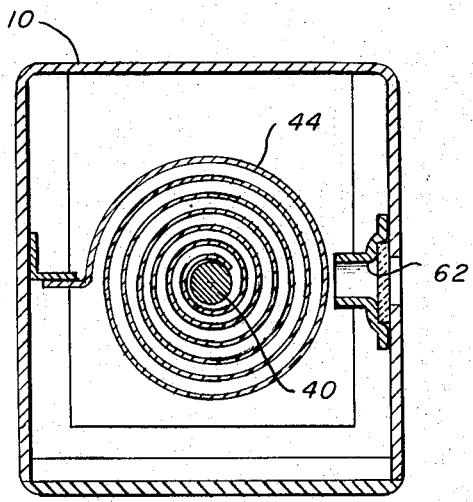
FIG. 3 of the drawings is a cross-sectional view of the power supply of this invention taken along line 3—3 of FIG. 1.

Referring now to FIGS. 1 and 2, the components of the pulse generator of this invention are shown in cross section. An enclosed housing 10 is shown having received at the rearward end thereof connectors 12 for receiving electrical conductors which transmit the voltage pulse generated by the power supply of this invention to end devices (not shown) for utilization therein.

Disposed within housing 10 normal to the longitudinal axis thereof and permanently secured to an inner wall thereof by means of angle bracket 14 is an electrical alternator 16. Alternator 16 includes an outer circular casing 18 which coaxially receives and carries therein a rotor support member 20. Rotor support member 20 includes a barrel 22 and at the rearward end of barrel portion 22 a normal annular flange 28 which provides spacing between outer casing 18 and barrel 22 for accommodating armature coils 30 and laminations therefor. There may be a single coil or a plurality of coils depending upon the design requirements of each particular application. For example, when the power supply is to be used to initiate a typical pilot ejection system as will be discussed subsequently three coils are required.

Rotatably carried on bearing raceways 24A and 24B in barrel 22 is a magnetic member comprised of a rotor shaft 26 and a permanent field magnet 32 carried by shaft 26 directly inwardly of coils 30. Magnet 32 has at one end a north polarity and at the other end a south polarity. When required by particular application the rotor may carry a plurality of field magnets. Rotation of rotor shaft 26 results in the cutting of coils 30 by the magnetic field emanating from field magnet 32 thereby inducting a voltage in the coils 30.

The forward end of rotor shaft 26 riding in bearing raceway 24B contains an open ended slot 34 access to which is gained by axial aperture 35 in the forward end of rotor support member 20.

Rotation of rotor 26 is obtained by a spring-biasing assembly located within housing 10 forward of alternator 16. Forwardly spaced from alternator 16 is a bracket 36 secured to the inner wall of housing 10 normal to the longitudinal axis thereof. Bracket 36 contains a transverse hole which receives a bearing race 38 which in turn rotatably carries the forward end of an arbor 40. Arbor 40 rearwardly extends from bracket 38 to alternator 16 and includes at the rearward end thereof a tongue, rectangular in cross section, which projects rearwardly through aperture 35 to become keyed in the open ended slow 34 on the forward end of rotor shaft 26. The forward end of arbor 40 projects forwardly of bracket 36 and has cut therein a second open ended slot 42.

Intermediate bracket 36 and alternator 16 is a flat coil spring 44 encirculating arbor 40 and having the inner end thereof secured to arbor 40 and the outer end thereof appropriately secured to housing 10 as can be seen in FIG. 3. As is well known, coil springs in the wound state are capable of indefinitely storing potential energy which is converted into kinetic energy during the transition from the wound to the unwound state. Coil spring 44 serves the purpose of imparting rotative movement to arbor 40 and rotor shaft 26 during the unwinding thereof.

A pawl 46 pivotally secured to housing 10 forward of bracket 36 has a reduced thickness edge portion 48 engageable in open ended slot 42 to retain coil spring 44 in the wound ready state. Pivotal movement of pawl 46 is manually controlled by a hand actuator 50 which at the rearward end thereof engages an elongated slot 52 in pawl 46. Hand actuator 50 projects forwardly from housing 10 and is slidably received in a tubular sheath 54 which has therein a borehole 56. For each hand manipulation thereof the forward end of hand actuator 50 projects beyond sheath 54 and may include an aperture therein or other means for further facilitating hand manipulation. The length of elongated slot 52 permits a certain amount of free travel of hand actuator 50 before pivotal movement of pawl 54 is initiated. A resilient O-ring 55 prohibits entrance of moisture into the interior of housing 10.

Positive engagement of reduced edge portion 48 of pawl 46 is open ended slot 42 of arbor 40 is assured by helical spring 57 received in borehole 56 of the sheath and abutting against a ring washer 58 secured to the rearward end of hand actuator 50.

A second method of disengaging pawl 54 from open-ended slot 42 is provided by an explosive actuator plunger mechanism 60 appropriately disposed within housing 10 and adopted upon energization thereof to forwardly pivot pawl 46.

A leaf spring 61 is provided to prohibit reengagement of pawl 46 in open ended slot 42 once the pulse generating cycle has been commenced by the unwinding of coil spring 44.

Visual indication of the state of the coil spring 44 is provided by indicator 62 hermetically sealed over an aperture in the side of casing 10. Coil spring 44 is painted in contrasting colors so that in the wound condition one color will appear to the eye looking through the indicator 62 while a different contrasting color will appear to the eye when the spring is in the unwound state.

Figure 4:
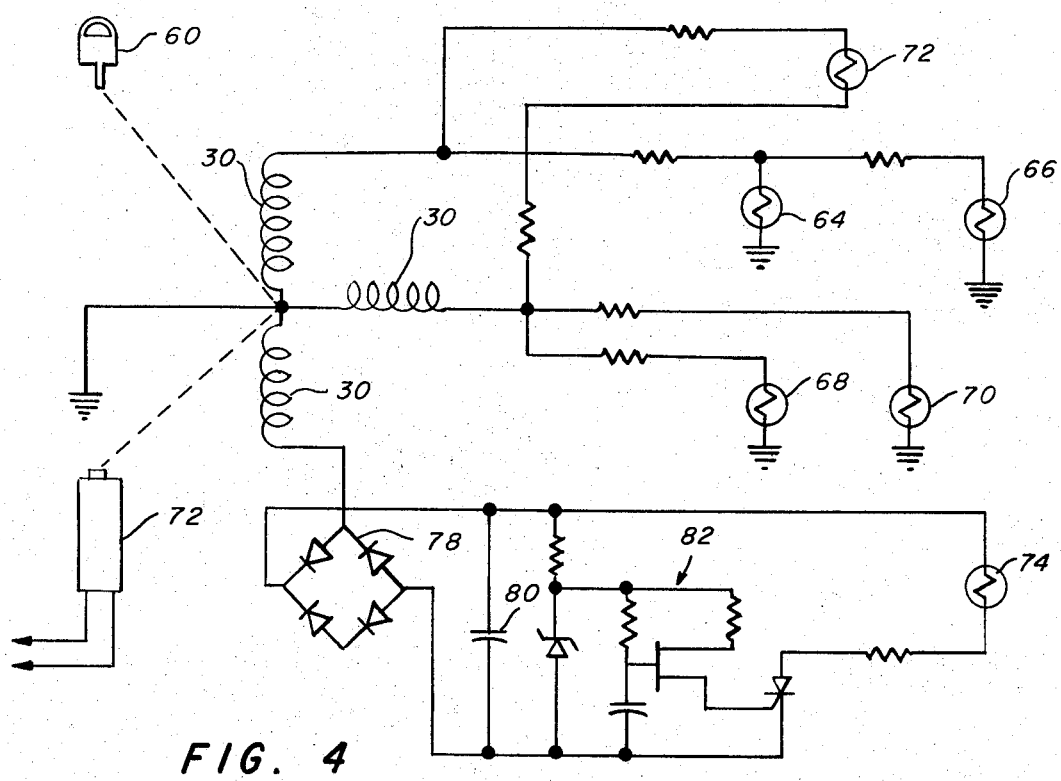
FIG. 4 of the drawings is an electrical schematic of the power supply of this invention as used in a pilot ejection system.

FIG. 4 of the drawings schematically shows the electric circuit of a pilot escape system utilizing the power supply of this invention as the voltage generating source. The schematic is shown by way of example only and is merely one of the many instances where the power supply of this invention can be applied to furnish voltage to the electric circuit. The pilot escape system shown incorporates the electrical components of typical pilot escape systems and includes a thermal battery recovery sequencer 64, an arm restraint thruster 66, an inertia reel 68, a canopy kickoff 70, a second seat 72, and a rocket catapult 74, all schematically represented in FIG. 4. The electrical components of the schematic are represented by block 76 shown in FIG. 1 of the drawings.

Looking now to the schematic of FIG. 4, the output of one of the coils 30 is electrically tied to thermal battery recovery sequencer 64 and the arm restraint thruster 66 while the output of a second one of the coils 30 is applied to the canopy kickoff 70 and the inertia reel 68. The two coils just mentioned in the example illustrated contain the same number of turns and hence at any given time contain the same RMS value of voltage thereon. The second seat 72 is tied across outputs of these first two coils as can be seen in the schematic. The remaining coils 30 contain more turns than the others and consequently have induced therein a greater RMS voltage. The output of these coils are applied to a DC time delay circuit through a voltage rectifier 78 which passes the rectified pulse through a time delay circuit 82 before it is fed into the rocket catapult mechanism 74.

In the normal state, coil spring 44 is wound and held in the wound state by engagement of pawl 46 in open ended slot 42 of arbor 40. As has been previously mentioned, the coil spring in the wound state will store potential energy for an indefinite period of time. When the aircraft which the pilot is piloting incurs some mechanical or other malfunction necessitating abandonment of the aircraft, the pilot disengages pawl 46 from arbor 40 by the forward movement of hand actuator 50 which permits unwinding of coil spring 44 which in turn rotates arbor 40 and rotor shaft 26. During the rotation of rotor shaft 26, the magnetic field emanating from permanent field magnet 32 cuts coils 36 to induce voltage therein, thereby energizing the components of the pilot ejection system.

The electrical load, timing and size of the coil spring requirements for each application can be mathematically determined by the use of existing engineering equations. For instance, for the power supply used in the schematic of FIG. 4 for a pilot ejection system an electrical load of 300 watts is needed for a total time of 0.025 seconds. Converting the electrical wattage requirements into torque terms, a flat spring of approximately the size 0.013 inch times 1 inch times 66 inches is required to be wound 12 times on arbor 40. Obviously other size springs will be required for each specific application and a specific sizing thereof can be easily mathematically determined.

During the detailed description of the preferred embodiment specific language has been used for the sake of clarity, however, it is to be understood that such words are not words of limitation and include all equivalents which operate in a similar manner to accomplish a similar purpose.

What is claimed is:

1. A power supply for generating an electrical pulse comprising:
   a housing;
   a coil supported by said housing;
   a rotatably supported rotor shaft having a slotted end;
   a magnetic member supported by said shaft;
   a spring assembly interconnected to said shaft and adapted to store energy when in a wound state;
   a release pawl pivotally secured to said housing and engageable with said shaft slotted end to retain said shaft in a wound state; and
   means carried by said housing to pivot said release pawl from engagement with said shaft slotted end whereby said spring unwinds, causing rotation of said shaft and said magnetic; member relative to said coil to induce voltage in said coil.

2. A power supply for generating an electrical pulse as in claim 1 including a plurality of coils supported by said housing and encompassing said magnetic member.

3. A power supply for generating an electrical pulse as in claim 1 including electrical means adopted to pivotally disengage said pawl from said slotted end of said extension arbor whereby said spring unwinds causing rotation of said magnetic member relative to said coil to induce voltage in said coil.

4. A power supply for generating an electrical pulse as in claim 1 including a leaf spring for prohibiting reengagement of said pawl into said slotted end of said extension arbor after said pawl has been disengaged therefrom.

5. A power supply for generating an electrical pulse as in claim 1 including visual indication means for determining the wound or unwound state of said coil spring.

6. A power supply for generating an electric pulse according to claim 1 including circuit means connected to said coil including means of storing at least a portion of the energy induced in said coil when said magnetic member is rotated relative to said coil and including time delay means for releasing at least a portion of said energy at at least one preselected time interval.

7. A power supply for generating an electrical pulse according to claim 1 including remotely controllable pyrotechnic piston means supported to said housing and having connection with the release pawl, said pyrotechnic means functioning as said means to operably release said release pawl.

* * * * *